United States Patent
Gutknecht et al.

(10) Patent No.: US 11,051,452 B2
(45) Date of Patent: Jul. 6, 2021

(54) AUTO-CYCLING DECK PLATES FOR AN AGRICULTURAL VEHICLE

(71) Applicant: CNH Industrial America LLC, New Holland, PA (US)

(72) Inventors: Brett Gutknecht, Cedar Falls, IA (US); Dan L. Garland, Solon, IA (US); Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 252 days.

(21) Appl. No.: 16/206,373

(22) Filed: Nov. 30, 2018

(65) Prior Publication Data

US 2020/0170187 A1 Jun. 4, 2020

(51) Int. Cl.
| | |
|---|---|
| *A01D 41/127* | (2006.01) |
| *A01D 45/02* | (2006.01) |
| *A01D 47/00* | (2006.01) |
| *A01D 67/00* | (2006.01) |

(52) U.S. Cl.
CPC ....... *A01D 41/1276* (2013.01); *A01D 45/021* (2013.01); *A01D 47/00* (2013.01); *A01D 67/00* (2013.01)

(58) Field of Classification Search
CPC .. A01D 41/1276; A01D 45/021; A01D 47/00; A01D 67/00; A01D 45/02; A01D 45/023; A01D 41/127
See application file for complete search history.

(56) References Cited

U.S. PATENT DOCUMENTS

| | | | |
|---|---|---|---|
| 8,966,871 B2 | 3/2015 | Nafziger et al. | |
| 9,320,196 B2 | 4/2016 | Dybro et al. | |
| 9,750,187 B2 * | 9/2017 | Walker | A01D 45/021 |
| 9,820,438 B2 * | 11/2017 | Barry | A01D 45/021 |
| 9,867,334 B2 * | 1/2018 | Jongmans | A01D 45/021 |
| 9,867,335 B1 * | 1/2018 | Obbink | A01D 45/021 |
| 10,334,784 B2 * | 7/2019 | Ricketts | A01D 45/025 |

(Continued)

FOREIGN PATENT DOCUMENTS

| | | |
|---|---|---|
| EP | 2642242 A1 | 9/2013 |
| WO | 2013078328 A2 | 5/2013 |

OTHER PUBLICATIONS

Extended European Search Report for EP Application No. 19212249.7 dated Mar. 30, 2020 (six pages).

*Primary Examiner* — Arpad Fabian-Kovacs (74) *Attorney, Agent, or Firm* — Peter Zacharias; Patrick Sheldrake (57) ABSTRACT

A method for operating an agricultural vehicle. The method includes an initial step of providing the agricultural vehicle which includes a feeder housing and a header. The header includes at least one row unit, which has a pair of deck plates, and a deck plate adjustment system. The deck plate adjustment system includes at least one actuator connected to the deck plates, an electronic control unit operably connected to the at least one actuator, and at least one sensor. The method includes the further steps of pivoting the feeder housing to raise the header, sending, by the at least one sensor, a signal to the electronic control unit, and cycling the deck plates, by the electronic control unit actuating the at least one actuator to move the deck plates, for removing a buildup of material on the deck plates.

20 Claims, 4 Drawing Sheets

(56) References Cited

U.S. PATENT DOCUMENTS

| | | | |
|---|---|---|---|
| 2008/0092507 A1 | 4/2008 | Bollig | |
| 2011/0173942 A1* | 7/2011 | Kowalchuk | A01D 45/021 |
| | | | 56/62 |
| 2012/0029757 A1* | 2/2012 | Kowalchuk | A01D 45/021 |
| | | | 701/34.2 |
| 2014/0053524 A1* | 2/2014 | Werning | A01D 41/1273 |
| | | | 56/62 |
| 2014/0230580 A1* | 8/2014 | Dybro | A01D 45/021 |
| | | | 73/865 |
| 2015/0319929 A1 | 11/2015 | Hendrickson et al. | |
| 2015/0327440 A1* | 11/2015 | Dybro | A01D 45/021 |
| | | | 73/862.541 |
| 2016/0113199 A1* | 4/2016 | Jongmans | A01D 41/1273 |
| | | | 56/10.2 R |
| 2017/0238467 A1* | 8/2017 | Gessel | A01D 57/22 |
| 2017/0280620 A1 | 10/2017 | Desai et al. | |

\* cited by examiner

AUTO-CYCLING DECK PLATES FOR AN AGRICULTURAL VEHICLE

BACKGROUND OF THE INVENTION

The present invention pertains to agricultural headers and, more specifically, to a deck plate assembly for an agricultural corn header.

An agricultural harvester known as a "combine" is historically termed as such because it combines multiple harvesting functions, such as picking, threshing, separating, and cleaning, in a single harvesting unit. Generally, a combine includes a chassis, a prime mover, a feeder housing, a header removably attached to the feeder housing for removing the crop from a field, a threshing system, and a cleaning system downstream of the threshing system. The threshing system may include an axially displaced threshing rotor and a perforated rotor housing, which can be composed of adjustable concaves. The threshing rotor is provided with rasp bars that interact with the crop material, and as the threshing rotor rotates within the rotor housing the threshing rotor performs a threshing operation on the crop material to remove the grain and provides positive crop movement. Once the grain is threshed, the grain falls through the perforations in the rotor housing and is subsequently cleaned by the cleaning system. The cleaning system includes a cleaning fan which blows air through oscillating sieves to discharge chaff and other debris toward the rear of the combine. Non-grain crop material or material other than grain (MOG), such as straw, from the threshing and cleaning systems proceeds through a straw chopper and out the rear of the combine. Clean grain is transported, by a clean grain auger, to a grain tank onboard the combine.

A typical header generally includes a frame, a pair of end dividers at the lateral ends of the frame, a cutter to remove crop material from the field, and a conveyor to transport the cut crop material to the feeder housing for further downstream processing in the combine. Generally, these features of a header are individually optimized to harvest a particular kind of crop material. For instance, the header may be in the form of a draper header which has a cutter bar, a draper belt, and a rotating reel with tines or the like in order to harvest a bushy or fluffy crop material, such as soy beans or canola. Alternatively, the header may be in the form of a corn header which includes an auger and row units with snouts, gathering chains, and stalk rolls for harvesting corn.

Generally, a corn header may include a frame, corn snouts, a conveyor, row units, and accompanying drive architecture which powers the row units. The snouts are conically shaped to pass in between the rows of corn, defining a designated passageway in between the snouts for the rows of corn to travel therein. The conveyor is disposed aft of the row units and it may be in the form of a conveyor belt, an auger with a tubular shaft having left and right flighting, or a combination of both. Each row unit generally includes a pair of gathering chains, a pair of juxtaposed deck or stripper plates, and a pair of stalk rolls. Each row unit also includes gear boxes to drive the gathering chains and stalk rolls. A gathering chain generally includes chain links, which form an endless chain, and protuberances, such as paddles, affixed thereto for contacting the corn stalks. Typically, a gathering chain has 48 chain links and 6-8 paddles spaced about the endless chain. Juxtaposed deck plates are generally parallel and define a stalk-receiving gap or channel therebetween. As the agricultural vehicle traverses the field, the corn stalks are pulled inwardly by the gathering chains and downwardly by the stalk rolls. This motion causes the ears of corn to forcibly contact the deck plates, and thereby the ears snap off their respective stalks. The gathering chains additionally help to move crop material inwardly towards the conveyor, which then transports the ears to the center of the header for entry into the feeder housing. The stripped corn stalks are further pinched and crushed by the stalk rolls, in order to accelerate the decomposition process of the stalks. The header may also include chopping units that have reciprocating blades located beneath the stalk rolls to chop the stalks, leaves, and MOG.

Deck plates can be movably mounted to the frame so that the size of the gap can be adjusted for accommodating different crop conditions. For example, each row unit may include a lever and/or hydraulic cylinder connected in between the frame and at least one of the deck plates to widen or narrow the gap. The gap may be widened so that the stalks do not contact either deck plate, or the gap may be narrowed so that the edges of the deck plates slightly pinch the stalks. A wide gap can have the advantage of allowing a greater amount of crop residue to pass therethrough; yet, the wide gap may also disadvantageously lead to ear loss. On the other hand, a narrow gap may lead to ear savings since the narrow gap does not allow smaller ears to pass therethrough. However, the narrow gap may excessively pinch the stalks such that the stalks become bunched or lodged in a respective row unit, which may ultimately lead to ear loss. In either case, dust, debris, and/or crop material may build up on the deck plates during harvesting of the crop material. For instance, the dust, debris, and/or crop material may become lodged in the gap between the deck plates and/or at the rear ends of the deck plates, adjacent to the frame. Overtime, if the deck plates are not regularly cleaned, the lodged debris and/or crop material may inhibit the deck plates from being adjusted and/or prevent the crop material from entering the row units entirely.

What is needed in the art is a row unit that can automatically prevent dust, debris, and/or crop material from inhibiting the operation of the deck plates.

SUMMARY OF THE INVENTION

In one exemplary embodiment formed in accordance with the present invention, there is provided a header with at least one row unit, which has a pair of deck plates, and a deck plate adjustment system. The deck plate adjustment system includes at least one actuator, a controller, and at least one sensor. The controller automatically cycles the deck plates by actuating the at least one actuator to move the deck plates for narrowing and/or widening the gap between the deck plates. Thereby, the cycling of the deck plates automatically cleans a buildup of material on the deck plates by moving the deck plates in order to move or dislodge the buildup of material on the deck plates.

In another exemplary embodiment formed in accordance with the present invention, there is provided a method for operating an agricultural vehicle. The method includes the steps of providing a feeder housing configured for pivotally connecting to the agricultural vehicle and a header configured for connecting to the feeder housing and moving between a header work position for harvesting a crop material and a header raised position. The header includes a frame and at least one row unit connected to the frame. The at least one row unit includes a pair of deck plates that are moveably connected to the frame. A deck plate adjustment system is also provided. The deck plate adjustment system includes at least one actuator connected to the deck plates, an electronic control unit operably connected to the at least one actuator, and at least one sensor connected to one of the feeder housing and the header and operably connected to the electronic control unit. The method includes the further steps of pivoting the feeder housing to raise the header to the header raised position, sending, by the at least one sensor, a signal to the electronic control unit upon raising the header to the header raised position, and cycling the deck plates, by the electronic control unit actuating the at least one actuator to move the deck plates, upon receiving the signal from the at least one sensor for removing a buildup of material on the deck plates.

In yet another exemplary embodiment formed in accordance with the present invention, there is provided an agricultural vehicle. The agricultural vehicle including a chassis, a feeder housing pivotally connected to the chassis, and a header connected to the feeder housing and configured for moving between a header work position for harvesting a crop material and a header raised position. The header includes a frame and at least one row unit connected to the frame. The at least one row unit includes a pair of deck plates moveably connected to and supported by the frame. The agricultural vehicle also includes a deck plate adjustment system which includes at least one actuator connected to the deck plates, an electronic control unit operably connected to the at least one actuator, and at least one sensor connected to one of the feeder housing and the header and operably connected to the electronic control unit. The at least one sensor is configured for sending a signal to the electronic control unit upon the header being in the header raised position. The electronic control unit cycles the deck plates, by actuating the at least one actuator to move the deck plates, upon receiving the signal from the at least one sensor for removing a buildup of material on the deck plates.

In yet another exemplary embodiment formed in accordance with the present invention, there is provided a header for an agricultural vehicle. The header is configured for moving between a header work position for harvesting a crop material and a header raised position. The header includes a frame and at least one row unit connected to the frame. The at least one row unit includes a pair of deck plates moveably connected to and supported by the frame. The header also includes a deck plate adjustment system which includes at least one actuator connected to the deck plates, an electronic control unit operably connected to the at least one actuator, and at least one sensor operably connected to the electronic control unit. The at least one sensor is configured for sending a signal to the electronic control unit upon the header being in the header raised position. The electronic control unit cycles the deck plates, by actuating the at least one actuator to move the deck plates, upon receiving the signal from the at least one sensor for removing a buildup of material on the deck plates.

One possible advantage of the exemplary embodiment of the deck plate adjustment system is that the controller may automatically cycle the deck plates by moving the deck plates to subsequently move material off the deck plates, thereby cleaning the deck plates.

Another possible advantage of the exemplary embodiment of the deck plate adjustment system is that the deck plates can be automatically cycled at given intervals.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
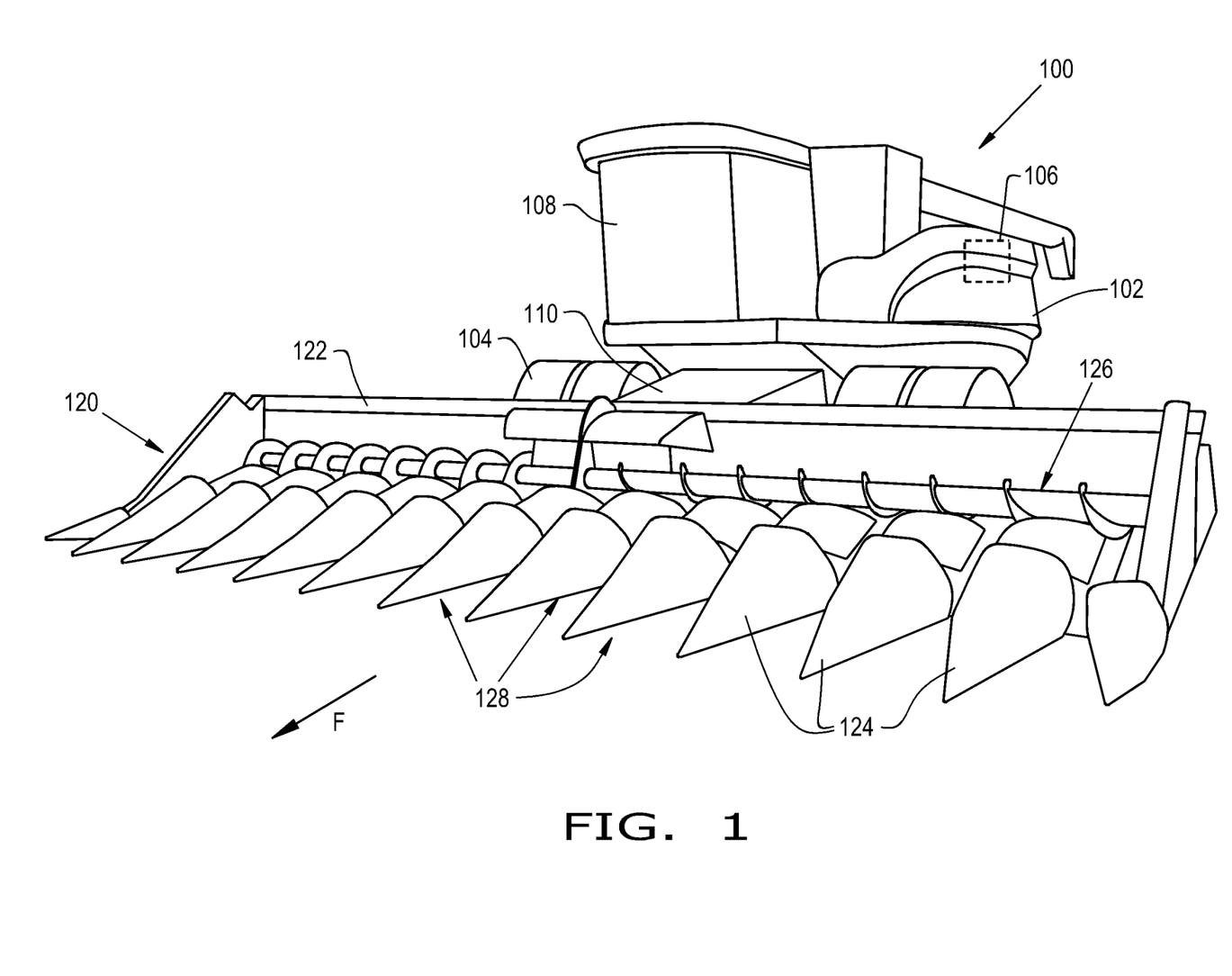
FIG. 1 illustrates a perspective view of an exemplary embodiment of an agricultural vehicle including a corn header which has multiple row units, in accordance with an exemplary embodiment of the present invention.
Figure 2:
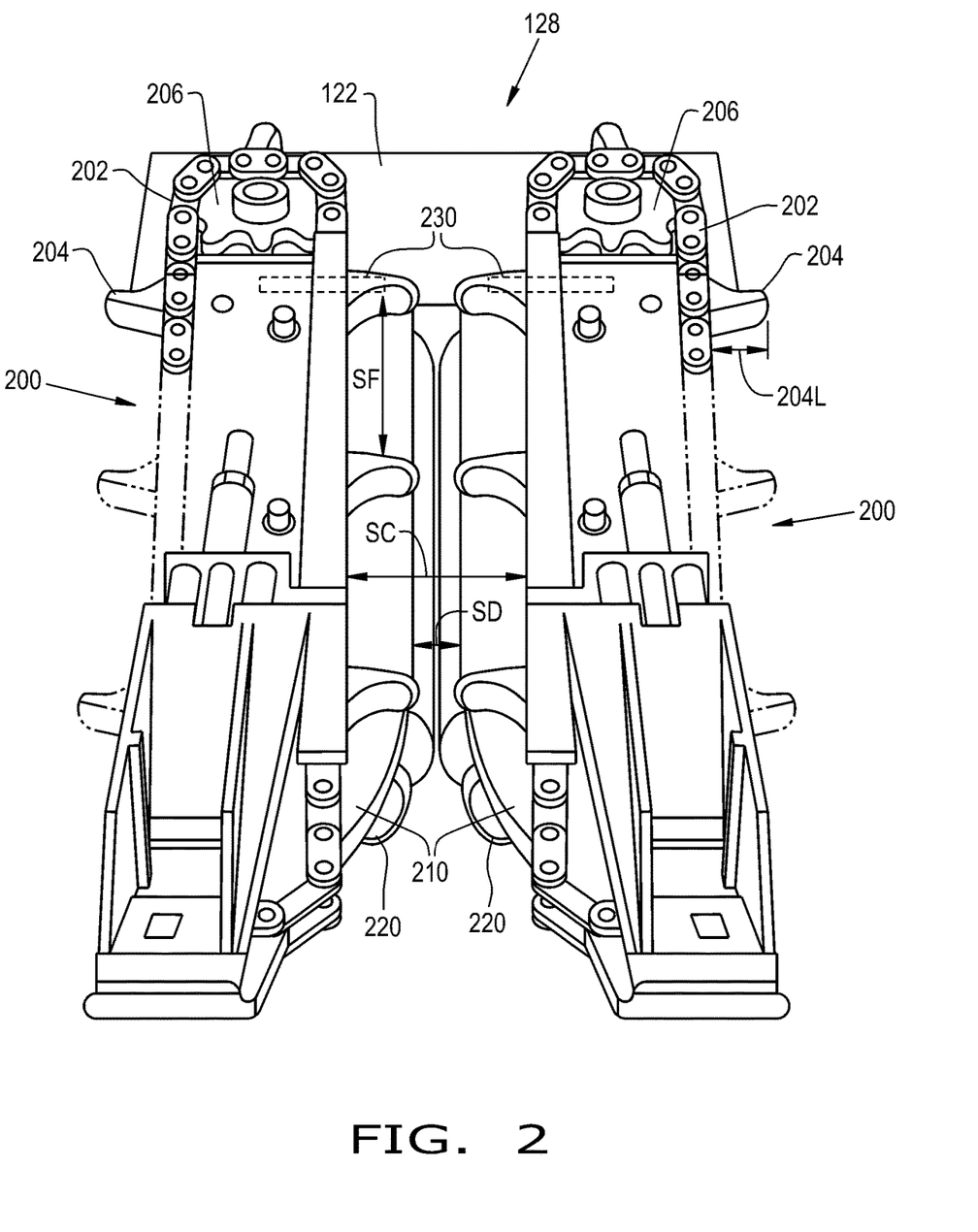
FIG. 2 illustrates a perspective view of a row unit of the header of FIG. 1, in accordance with an exemplary embodiment of the present invention.

Referring now to the drawings, and more particularly to FIGS. 1-2, there is shown an exemplary embodiment of an agricultural vehicle 100. The agricultural vehicle 100 may generally include a chassis 102, wheels 104 driven by a prime mover 106, an operator cab 108, a feeder housing 110 pivotally connected to the chassis 102, and a header 120. The agricultural vehicle 100 may be in the form of any desired agricultural vehicle, such as a combine 100.

The header 120 may be connected to the feeder housing 110, and may be positioned by the feeder housing 110 in a header work position for harvesting the crop material, e.g. rows of corn, and a header raised position. Hence, the feeder housing 110 may have one or more actuators for pivoting the feeder housing 110 upwardly to raise the header 120 in the header raised position and pivoting the feeder housing 110 downwardly to lower the header 120 in the header work position. As the agricultural vehicle 100 traverses the field and harvests the rows of corn, the agricultural vehicle 100 will conduct an end-of-row turnaround procedure at the end of the rows of corn which the agricultural vehicle 100 has just finished harvesting. The end-of-row turnaround procedure of the agricultural vehicle 100 may include pivoting the feeder housing 110 upwardly to raise the header 120 into the header raised position, performing a turn, for example a "U"-turn, to approach a new set of rows of corn, and pivoting the feeder housing 110 downwardly to lower the header 120 into the header work position. Then, the agricultural vehicle 100 may begin harvesting the new rows of corn. The sequential pivoting of the feeder housing 110 to raise and then lower the header 120, during the end-of-row turnaround procedure, may define an end-of-row-turning cycle of the header. In other words, raising the header 120 into the header raised position and lowering the header 120 into header work position during the end-of-row turnaround procedure may define the end-of-row-turning cycle of the header. It should be appreciated that the header raised position may include any elevated height of the header 120 in order for the agricultural vehicle 100 to conduct the end-of-row turnaround procedure. Additionally, the header raised position may refer to a position of the header when an acre counter of the agricultural vehicle 100 is turned off during the end-of-row turnaround procedure.

The header 120 may be in the form of any desired header, such as a corn header 120. The corn header 120 may include a header frame 122, multiple snouts 124 which define channels therebetween for receiving the rows of corn, a crop conveyor 126 such as an auger 126 to convey the crop material inwardly toward the feeder housing 110, and at least one row unit 128 connected to and supported by the frame 122.

Each row unit 128 generally includes a pair of gathers 200, a pair of deck, i.e., stripper, plates 210, and a pair of crop or snap rollers 220 (FIG. 2). Each row unit 128 may also include choppers, located underneath the crop rollers 220, which can be in the form of rotating blades that cut the corn stalks into smaller pieces (not shown). The gatherers 200, the snap rollers 220, and/or the choppers may be driven by gearboxes coupled to one or more cross shaft(s), which are operably coupled to the PTO of the agricultural vehicle 100. As the agricultural vehicle 100 traverses a field in a forward direction, denoted by arrow "F", the standing corn stalks are removed from the field and are pulled inwardly by the gatherers 200 and downwardly by the snap rollers 220. As the stalks are pulled downwardly in between the deck plates 210, the ears of corn forcibly contact the deck plates 210 and snap off their respective stalks. The gatherers 200 may then inwardly transport the free ears of corn into the header 120, and the conveyor 126 may transport the ears of corn to the center of the header 120 for entry into the feeder housing 110. The stalks and the remaining MOG are pulled down by the stalk rollers 220 and may be chopped into smaller pieces by the chopper.

Each gatherer 200 typically includes a chain 202 and a plurality of protuberances 204 connected to the chain 202. The gatherers 200 may be juxtaposed to one another such that they are separated by a space SC extending longitudinally along the length of the gatherers 200. The chains 202 may be operably coupled to and driven by sprockets 206. The protuberances 204 may be in the form of fingers 204 which contact and convey the crop material rearwardly toward the inside of the header 120. The protuberances 204 may extend outwardly from the chain 202 at a length 204L. The protuberances 204 may be spaced apart from one another by a space SF.

The deck plates 210 may be moveably connected to and supported by the frame 122. For example, the deck plates 210 can be slideably connected to the frame 122. A respective pair of deck plates 210 in a given row unit 128 can be juxtaposed such that the deck plates 210 are substantially parallel and define a stalk-receiving gap or slot SD therebetween. The deck plates 210 can be positioned in a deck plate operating position. The deck plate operating position may refer to the position of the deck plates 210 when the header 120 is harvesting the crop material in the header work position. For instance, the deck plate operating position can be the position of the deck plates 210 at which the gap SD is optimized and set to a desired width for receiving a particular kind and/or width of corn stalk. The deck plates 210 may have any desired shape and comprise any desired material. For instance, each deck plate 210 can have a sloped surface such that the surface biases material to fall out of a respective row unit 128.

Each row unit 128 may also include at least one actuator 230 that is interconnected in between the frame 122 and at least one of the deck plates 210. For example, each row unit 128 may include only one actuator 230 that is coupled to both deck plates 210, or each row unit 128 may include a pair of actuators 230 that are respectively coupled to each deck plate 210. The actuator(s) 230 may slide one or both of the deck plates 210 to narrow or widen the gap SD between the edges of adjacent deck plates 210. For instance, the actuator(s) 230 may position the deck plates 210 into a retracted position or an extended position. The retracted position of the deck plates 210 may be the position at which the gap SD is the widest, e.g. a maximum open position. The extended position of the deck plates 210 may be the position at which the gap is the smallest, e.g. a maximum closed position. Each actuator 230 may be in the form of any desired actuator, such as a hydraulic or electric cylinder. In the present exemplary embodiment, the actuators 230 are in the form of hydraulic cylinders 230. Each row unit 128 may include various hydraulic fluid lines to connect the hydraulic cylinders 230 to the hydraulic systems of the header 120 and/or agricultural vehicle 100. Additionally or alternatively, each row unit 128 may include levers connected to the deck plates 210 for manually adjusting the position of the deck plates 210.

Figure 3:
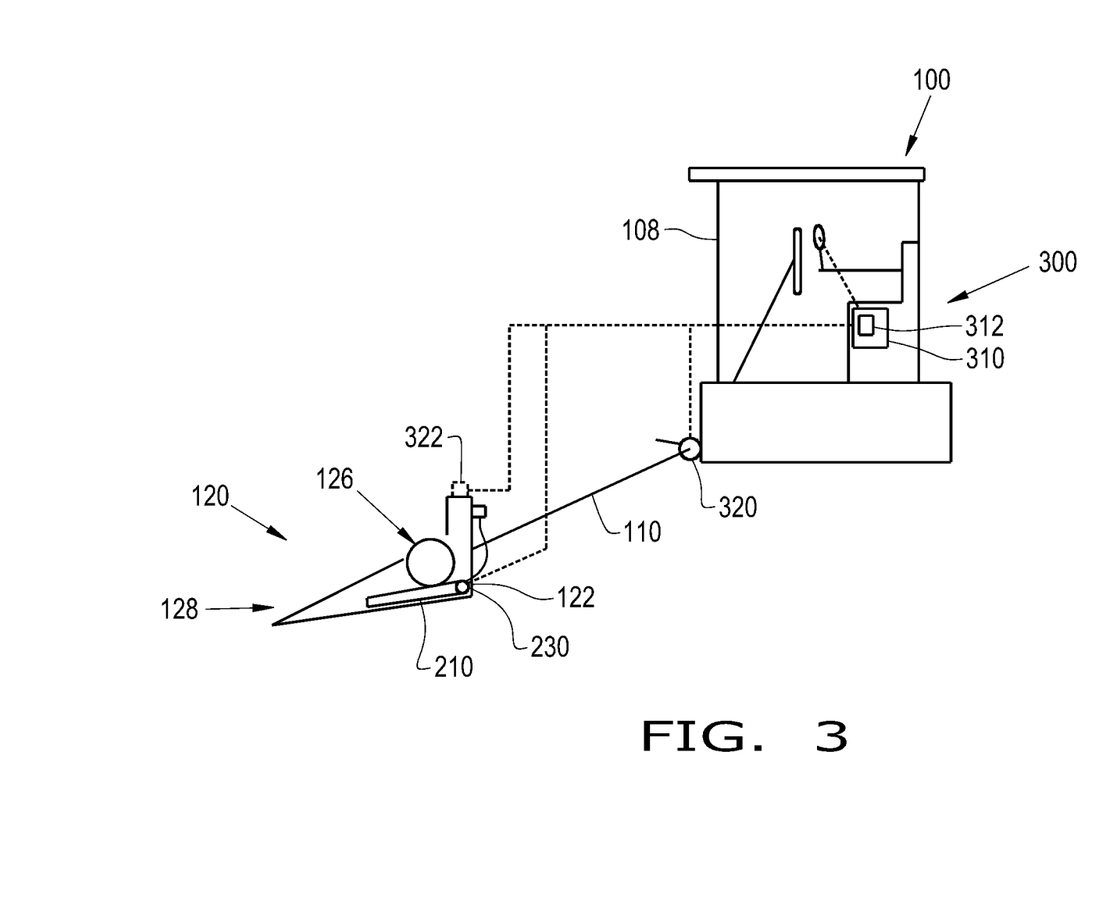
FIG. 3 illustrates a schematic view of the agricultural vehicle and the header of FIG. 1, in accordance with an exemplary embodiment of the present invention.

Referring now collectively to FIGS. 2-3, the agricultural vehicle 100 may further include a deck plate adjustment system 300 for automatically cycling the deck plates 210 to clean a buildup of material, such as dust, debris, and/or lodged crop material, from the deck plates 210. For instance, during cycling of the deck plates 210, the back and/or forth, e.g. opening and/or closing, motion of the deck plates 210 can cause the material to fall off the deck plates 210. The deck plate adjustment system 300 may generally include the actuator(s) 230, an electronic control unit (ECU), such as a controller 310, and at least one sensor 320, such as a pair of sensors 320, 322. It should be appreciated that the deck plate adjustment system 300 may be incorporated as part of the header 120.

The controller 310 may be operably connected to the actuator(s) 230 and the sensor(s) 320, 322. The controller 310 may selectively actuate the actuator(s) 230 to widen or narrow the gap SD between a respective pair of deck plates 210. The controller 310 may also include a tangible computer readable medium 312 for storing software code or instructions. The controller 310 may be in the form of any desired ECU. The controller 310 may be incorporated into existing hardware and/or software of the header 120 or agricultural vehicle 100. For example, the controller 310 may be incorporated into the existing vehicle control unit (VCU) in the operator cab 108 of the agricultural vehicle 100.

The one or more sensors 320, 322 may be connected to the feeder housing 110 and/or the header 120, as well as operably connected to the controller 310. For example, the agricultural vehicle 100 may only include one sensor 320, which may be connected to the feeder housing 110 (FIG. 3). The sensor 320 may be in the form of any desired sensor, such as a potentiometer 320 connected to the feeder housing 110. Additionally or alternatively, the agricultural vehicle 100 may include another sensor 312, which may be connected to and supported by the header 120. The sensor 312, which is connected to the header 120, may be in the form of any desired sensor, such as a header height sensor 322 that measures the vertical position of the header 120. Either sensor 320, 322 may send a feedback signal to the controller 310 and/or to the operator via an indicator light. For example, the sensor 320 may register a position and/or angle of the feeder housing 110 and may send a feedback signal to the controller 310 when the header 120 is raised into the header raised position.

Figure 4:
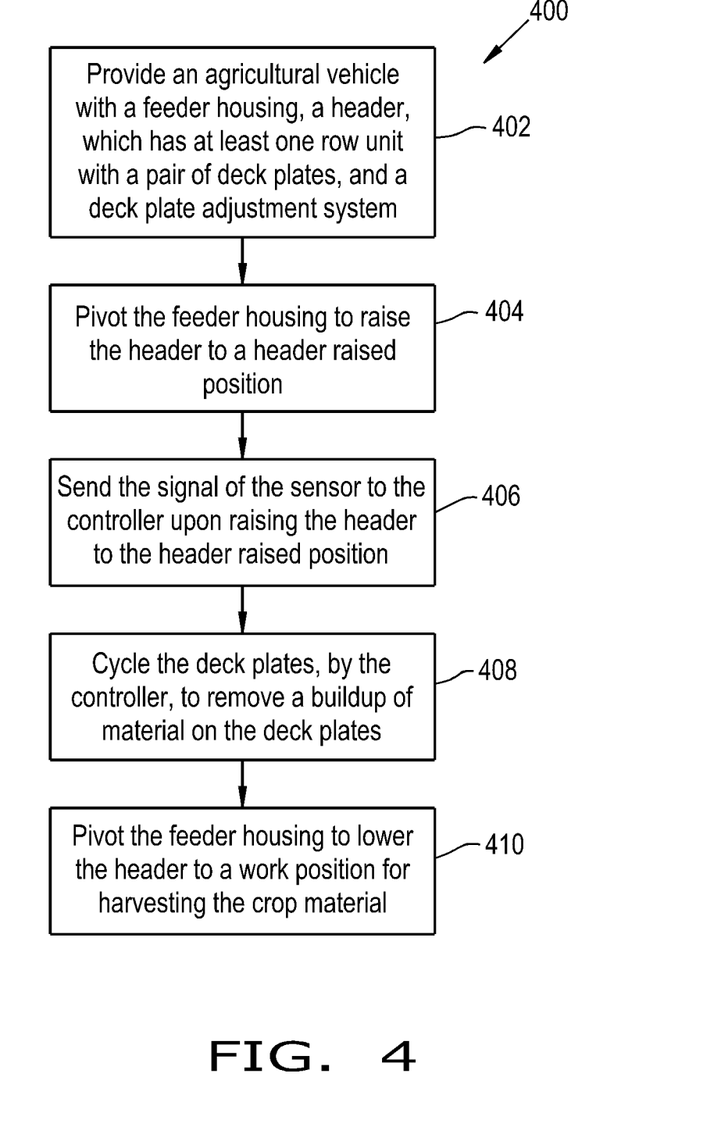
FIG. 4 is a flow diagram of a method for operating the agricultural vehicle to automatically cycle the deck plates, in accordance with an exemplary embodiment of the present invention.

Referring now to FIG. 4, there is shown a flow diagram of a method 400 for operating the agricultural vehicle 100 to automatically cycle the deck plates 210 during the end-of-row turnaround procedure of the agricultural vehicle 100. The method 400 includes an initial step of providing the agricultural vehicle 100 which includes the feeder housing 110, the header 120, and the deck plate adjustment system 300, as discussed above (at block 402). The method 400 includes another step of pivoting the feeder housing 110 to raise the header 120 to the header raised position, which then begins the end-of-row-turning cycle of the header 120 (at block 404). Next, the at least one sensor 320, 322 may then send the feedback signal to the controller 310 when the header 120 is raised into the header raised position (at block 406). Then, when the header 120 is no longer harvesting the crop material, the controller 310 may begin cycling the deck plates 210, by actuating the at least one actuator 230 to move the deck plates 210, upon receiving the signal from the at least one sensor 320, 322 (at block 408). Thereby, the cycling of the deck plates 210 may remove the buildup of material which has collected on the deck plates 210 during harvesting of the crop material. The method 400 may further include the step of pivoting the feeder housing 110 to lower the header 120 to the work position for again harvesting the crop material, which then ends the end-of-row-turning cycle of the header 120 (at block 410).

The "cycling" of the deck plates 210, as used herein, may refer to the opening and/or closing of the deck plates 210, by way of the controller 310 actuating the actuator(s) 230. For example, the controller 310 may cycle the deck plates 210 by opening the deck plates 210 to widen the gap SD between the deck plates 210 and/or closing the deck plates 210 to narrow the gap SD between the deck plates 210, and by resetting the deck plates 210 to the deck plate operating position. It should be appreciated that the controller 310 may first close and subsequently open the deck plates 210, and then reset the deck plates 210. Additionally, for example, the controller 310 may cycle the deck plates 210 by opening the deck plates 210 to the maximum open position, closing the deck plates 210 to the maximum closed position, and resetting the deck plates to the operating position. Alternatively, the controller 310 may cycle the deck plates 210 by opening the deck plates 210 and resetting the deck plates 210 in a first end-of-row-turning cycle of the header 120, and by closing the deck plates 210 and resetting the deck plates 210 in a second end-of-row-turning cycle of the header 120. Hence, the controller 310 may alternate the cycling of the deck plates 210 between subsequent end-of-row-turning cycles of the header 120, i.e., end-of-row-turnaround procedures of the agricultural vehicle 100. Furthermore, instead of cycling the deck plates 210 during every end-of-row-turning cycle of the header 120, the controller 310 may instead cycle the deck plates 210 after a given number of end-of-row-turning cycles of the header 120. For example, the controller 310 may cycle the deck plates 210 during a tenth end-of-row-turning cycle of the header 120.

It should be appreciated that the controller 310 cycles the deck plates 210 when the header 120 is not in the work position, i.e., harvesting the crop material. The method 400 describes the cycling of the deck plates 210 during a time period in which the agricultural vehicle 100 is transitioning, e.g. turning, from a previously harvested row(s) to another unharvested row(s) of crop material. However, it is conceivable that the controller 310 may cycle the deck plates 210 at another time when the header 120 is not presently harvesting the crop material. For example, the controller 310 may cycle the deck plates 210 at a time when the agricultural vehicle 100 is stationary. Furthermore, it should be appreciated that the header 120 may or may not be in the header raised position as the controller 310 cycles the deck plates 210.

It is to be understood that the steps of the method 400 may be performed by the controller 310 upon loading and executing software code or instructions. The controller 310 may include software code or instructions which are tangibly stored on the tangible computer readable medium 312. The computer readable medium 312 may be in the form of a magnetic medium, e.g., a computer hard drive, an optical medium, e.g., an optical disc, solid-state memory, e.g., flash memory, or other storage media known in the art. Thus, any of the functionality performed by the controller 310 described herein may be implemented in software code or instructions which are tangibly stored on the tangible computer readable medium 312. The controller 310 loads the software code or instructions via a direct interface with the computer readable medium 312 or via a wired and/or wireless network. Upon loading and executing such software code or instructions by the controller 310, the controller 310 may perform any of the functionality described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A method for operating an agricultural vehicle, comprising:

providing a feeder housing configured for pivotally connecting to the agricultural vehicle, a header configured for connecting to the feeder housing and moving between a header work position for harvesting a crop material and a header raised position, the header comprising a frame and at least one row unit connected to the frame, the at least one row unit comprising a pair of deck plates moveably connected to the frame, the deck plates of the at least one row unit being separated from one another by a gap, and a deck plate adjustment system comprising at least one actuator connected to the deck plates, an electronic control unit operably connected to the at least one actuator, and at least one sensor connected to one of the feeder housing and the header and operably connected to the electronic control unit;

pivoting the feeder housing to raise the header to the header raised position;

sending, by the at least one sensor, a signal to the electronic control unit upon raising the header to the header raised position; and cycling the deck plates while the header is in the header raised position, by the electronic control unit actuating the at least one actuator to move the deck plates, upon receiving the signal from the at least one sensor for removing a buildup of material on the deck plates, the cycling comprising opening the deck plates to widen the gap between the deck plates and closing the deck plates to narrow the gap between the deck plates.

2. The method of claim 1, wherein the deck plates are positionable in a deck plate operating position and cycling the deck plates further comprises resetting the deck plates to the deck plate operating position.

3. The method of claim 2, wherein cycling the deck plates comprises:
opening the deck plates to a maximum open position, closing the deck plates to a maximum closed position, and resetting the deck plates to the operating position.

4. The method of claim 2, further comprising a step of pivoting the feeder housing to lower the header to the header work position, and the sequential steps of pivoting the feeder housing to raise the header and pivoting the feeder housing to lower the header define an end-of-row-turning cycle of the header.

5. The method of claim 4, wherein cycling the deck plates comprises:
opening the deck plates and resetting the deck plates in a first end-of-row-turning cycle of the header; and
closing the deck plates and resetting the deck plates in a second end-of-row-turning cycle of the header.

6. The method of claim 4, wherein the step of cycling the deck plates is implemented upon a tenth end-of-row-turning cycle of the header.

7. The method of claim 1, wherein the at least one sensor is in the form of a potentiometer connected to the feeder housing.

8. The method of claim 1, wherein the at least one sensor is in the form of a header height sensor that is connected to the header.

9. The method of claim 1, wherein the at least one actuator comprises a pair of actuators, and each actuator is respectively connected to each deck plate.

10. An agricultural vehicle, comprising:
a chassis;
a feeder housing pivotally connected to the chassis;
a header connected to the feeder housing and configured for moving between a header work position for harvesting a crop material and a header raised position, the header comprising:
a frame; and
at least one row unit connected to the frame, the at least one row unit comprising a pair of deck plates moveably connected to and supported by the frame and separated from one another by a gap; and
a deck plate adjustment system comprising:
at least one actuator connected to the deck plates;
an electronic control unit operably connected to the at least one actuator; and
at least one sensor connected to one of the feeder housing and the header and operably connected to the electronic control unit, the at least one sensor being configured for sending a signal to the electronic control unit upon the header being in the header raised position, wherein the electronic control unit cycles the deck plates while the header is in the header raised position, by actuating the at least one actuator to move the deck plates, upon receiving the signal from the at least one sensor for removing a buildup of material on the deck plates, the electronic control unit cycles the deck plates so the deck plates open to widen the gap between the deck plates and close so the deck plates narrow the gap between the deck plates.

11. The agricultural vehicle of claim 10, wherein the deck plates are positionable in a deck plate operating position and the electronic control unit cycles the deck plates to:
reset the deck plates to the deck plate operating position.

12. The agricultural vehicle of claim 11, wherein the electronic control unit cycles the deck plates to open the deck plates to a maximum open position, close the deck plates to a maximum closed position, and reset the deck plates to the operating position.

13. The agricultural vehicle of claim 11, wherein the feeder housing is configured for pivoting to raise the header to the header raised position and pivoting to lower the header to the header work position such that the sequential pivoting of the feeder housing to raise and lower the header defines an end-of-row-turning cycle of the header.

14. The agricultural vehicle of claim 13, wherein the electronic control unit cycles the deck plates to:
open the deck plates and reset the deck plates in a first end-of-row-turning cycle of the header; and
close the deck plates and reset the deck plates in a second end-of-row-turning cycle of the header.

15. The agricultural vehicle of claim 13, wherein the electronic control unit cycles the deck plates upon a tenth end-of-row-turning cycle of the header.

16. The agricultural vehicle of claim 10, wherein the at least one sensor is in the form of a potentiometer connected to the feeder housing.

17. The agricultural vehicle of claim 10, wherein the at least one sensor is in the form of a header height sensor that is connected to the header.

18. The agricultural vehicle of claim 10, wherein the at least one actuator comprises a pair of actuators, and each actuator is respectively connected to each deck plate.

19. A header for an agricultural vehicle, the header being configured for moving between a header work position for harvesting a crop material and a header raised position, the header comprising:
a frame;
at least one row unit connected to the frame, the at least one row unit comprising a pair of deck plates moveably connected to and supported by the frame and separated from one another by a gap; and
a deck plate adjustment system comprising:
at least one actuator connected to the deck plates;

an electronic control unit operably connected to the at least one actuator; and at least one sensor operably connected to the electronic control unit, the at least one sensor being configured for sending a signal to the electronic control unit upon the header being in the header raised position, wherein the electronic control unit cycles the deck plates while the header is in the header raised position, by actuating the at least one actuator to move the deck plates, upon receiving the signal from the at least one sensor for removing a buildup of material on the deck plates, the electronic control unit cycles the deck plates so the deck plates open to widen the gap between the deck plates and close so the deck plates narrow the gap between the deck plates.

20. The header of claim 19, wherein the deck plates are positionable in a deck plate operating position and the electronic control unit cycles the deck plates to reset the deck plates to the deck plate operating position.

* * * * *